(12) United States Patent
Kimura et al.

(10) Patent No.: US 7,683,609 B2
(45) Date of Patent: Mar. 23, 2010

(54) METHOD OF PRODUCING A ROTATION DETECTION SENSOR

(75) Inventors: Masahiro Kimura, Chiryu (JP); Eiichiro Iwase, Toyoake (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 279 days.

(21) Appl. No.: 11/795,012

(22) PCT Filed: Jan. 13, 2006

(86) PCT No.: PCT/JP2006/000353

§ 371 (c)(1),
(2), (4) Date: Jul. 10, 2007

(87) PCT Pub. No.: WO2006/080197

PCT Pub. Date: Aug. 3, 2006

(65) Prior Publication Data

US 2008/0024121 A1 Jan. 31, 2008

(30) Foreign Application Priority Data

Jan. 26, 2005 (JP) .............................. 2005-018791

(51) Int. Cl.
*G01P 3/44* (2006.01)
(52) U.S. Cl. .............. 324/174; 324/207.2; 324/207.25; 384/448
(58) Field of Classification Search ........................ None
See application file for complete search history.

(56) References Cited

U.S. PATENT DOCUMENTS 5,602,335 A 2/1997 Ouchi (Continued)

FOREIGN PATENT DOCUMENTS

EP 1 178 319 A1 7/2001

(Continued)

OTHER PUBLICATIONS

International Search Report of PCT/JP2006/300353 mailed Apr. 18, 2006.

(Continued)

*Primary Examiner*—Jay M Patidar
(74) *Attorney, Agent, or Firm*—Stites & Harbison PLLC; Juan Carlos A. Marquez, Esq.

(57) ABSTRACT

A vehicle wheel speed sensor 10 includes a cover member 21 having a mounting hole 26, a detection unit 31, a connector terminal 38, and a connector 61. The connector 61 is arranged on a surface of the cover member 21 at a side opposite to a rotor 17. The detection unit 31 is arranged on a surface of the cover member 21 at a side of the rotor 17. The detection unit 31 includes a Hall device 32, which detects change in a magnetic flux caused by rotation of the rotor 17. A connector terminal 38 is electrically connected to the Hall device 32 and is inserted in the mounting hole 26 of the cover member 21 and in the connector 61. A resin molding portion 71 integrates the detection unit 31 and the connector 61 through the mounting hole 26 to integrate the cover member 21, the connector 61, and the detection unit 31.

7 Claims, 5 Drawing Sheets

U.S. PATENT DOCUMENTS

| | | | |
|---|---|---|---|
| 5,659,246 | A | 8/1997 | Togo et al. |
| 5,689,182 | A | 11/1997 | Togo et al. |
| 6,605,938 | B1 | 8/2003 | Sentoku et al. |
| 7,170,281 | B2 | 1/2007 | Harada |
| 2004/0150392 | A1 | 8/2004 | Nakano et al. |
| 2005/0007098 | A1 | 1/2005 | Harada |
| 2007/0286541 | A1* | 12/2007 | Matsui et al. ............... 384/448 |

FOREIGN PATENT DOCUMENTS

| | | |
|---|---|---|
| JP | 07-311211 | 5/1994 |
| JP | 10-239340 | 2/1997 |
| JP | 2000-310647 | 4/1999 |
| JP | 2001-305150 | 4/2000 |
| JP | 2004-045176 | 7/2002 |
| JP | 2004-198305 | 12/2002 |

OTHER PUBLICATIONS

U.S. Appl. No. 11/665,580, filed Apr. 16, 2007, Matsui.

International Preliminary Report on Patenatbility of PCT/JP2006/300353 mailed Jul. 31, 2007.

Extended European Search Report dated Nov. 6, 2008 regarding European Patent Application No. 06711638.4-1236 / 1860444 PCT/JP2006300353.

* cited by examiner

METHOD OF PRODUCING A ROTATION DETECTION SENSOR

FIELD OF THE INVENTION

The present invention relates to a rotation detection sensor.

BACKGROUND OF THE INVENTION

As one example of a rotation detection sensor, Japanese Laid-Open Patent Publication No. 2004-198305 discloses a rotation detection sensor applied to a hub unit of a vehicle. The hub unit includes an external cylinder and an internal cylinder. The external cylinder is fixed to a body of the vehicle. The internal cylinder, which rotates together with a vehicle wheel, is arranged inside the external cylinder. A rotor, which is cylindrical and has a flange, is fixed to the internal cylinder. The flange of the internal cylinder is magnetized in a manner that its north pole and its south pole are positioned alternately along its circumferential direction. The rotation detection sensor for detecting the rotation speed of the rotor (that is, the rotation speed of the vehicle wheel) is arranged on the external cylinder.

The rotation detection sensor includes a cover member for closing an end portion of the external cylinder. A connector having a connector terminal and a Hall device is attached to the cover member. The connector terminal is integrated with the connector through insert molding and electrically connected to the Hall device of the connector. The connector is connected to the cover member in a manner that the Hall device faces the flange of the rotor.

As a method for manufacturing the rotation detection sensor, the connector having the Hall device is first set in a mounting hole formed in the cover member. In a state set on the cover member, the connector is arranged in a mold to perform resin molding. The resin surrounding the Hall device is solidified to integrate the connector and the cover member. This completes the rotation detection sensor.

SUMMARY OF THE INVENTION

The shape of a mating connector to which the connector of the rotation detection sensor is connected differs depending on the type of vehicle to which the hub unit is mounted. The rotation detection sensor described in patent document 1 is required to design its connector according to the shape of the mating connector. This increases the types of connectors, which have Hall devices, that are required in correspondence with the types of mating connectors and results in burdensome process management. Further, the connector of the rotation detection sensor includes a Hall device, which is a semiconductor component. Thus, the process management of the rotation detection sensor needs to be performed with sufficient care.

Accordingly, it is an object of the present invention to provide a rotation detection sensor for alleviating the burden of process management.

To achieve the above object, a first aspect of the present invention is a rotation detection sensor for detecting rotation of a magnetized rotor based on a change in magnetic flux. The rotation detection sensor includes a cover member attached to a non-rotating body and having a mounting hole. A detection unit is arranged on a surface of the cover member at a side of the rotor and includes a detection portion capable of outputting a detection signal in accordance with a change in magnetic flux caused by rotation of the rotor. A connector terminal is electrically connected to the detection portion in a state inserted in the mounting hole. A connector is arranged on a surface of the cover member at a side opposite the rotor, with the connector terminal inserted therein. A resin molding portion integrates the detection unit and the connector through the mounting hole to integrate the detection unit, the connector, and the cover member.

The above structure eliminates the need for redesigning the detection unit when selecting one of plural types of connectors in correspondence with a mating connector. Further, even when the outer diameter of the cover member is changed, the detection unit does not need to be redesigned in correspondence with the changed outer diameter of the cover member. Additionally, even when the position or the diameter of the rotor is changed, it is only required that the position of the mounting hole formed in the cover member be changed. The detection unit does not need to be redesigned in correspondence with the changed position or the changed diameter of the rotor. This enables a single type of the detection unit to be adaptable to changes in the specification of the connector, the cover member, the rotor, and the like. Thus, the burden of process management is alleviated.

In the above rotation detection sensor, it is preferred that the detection unit includes a connecting member arranged between the connector terminal and the detection portion for electrically connecting the connector terminal and the detection portion. In such a case, the connector terminal and the detection portion are electrically connected by the connecting member. This eliminates the need for redesigning the detection unit when selecting one of plural types of connector terminals in correspondence with a mating connector.

In the above rotation detection sensor, it is preferred that the connector has an insertion hole into which the connector terminal is inserted and a large diameter portion having a diameter greater than a diameter of an opening of the insertion hole near the detection unit. In such a case, the resin molding portion for integrating the connector, the detection unit, and the cover member is formed in the large diameter portion. This prevents the connector from being separated from the cover member.

In the above rotation detection member, it is preferred that the cover member includes a first engagement portion and the resin molding portion includes a second engagement portion engageable with the first engagement portion, and engagement of the first engagement portion and the second engagement portion restricts movement of the detection unit relative to the cover member. In such a case, the detection portion of the detection unit is arranged in a stable state at a position facing the rotor without being affected by vibrations and the like. This enables rotation of the rotor to be detected with high accuracy.

In the above rotation detection sensor, it is preferred that the detection unit includes a holding portion for holding the detection portion, and the holding portion includes a positioning recess engageable with a positioning projection formed on a mold for forming the resin molding portion. In such a case, engagement of the positioning projection of the mold with the positioning recess of the holding portion enables the detection unit to be positioned relative to the mold. This prevents the detection unit from being displaced during formation of the resin molding portion.

In the above rotation detection sensor, it is preferred that the holding portion includes a support portion for supporting the connector terminal. In such a case, the connector terminal is prevented from being displaced or deformed during formation of the resin molding portion. This reduces the occurrence of defective products.

In the above rotation detection sensor, it is preferred that the holding portion includes a projecting portion projecting closer to an outer rim of the cover portion than the detection portion. In such a case, the projecting portion keeps the detection portion out of contact from the mold arranged between the detection portion and the cover member during formation of the resin molding portion. This permits a gap to be formed between the detection portion and the mold arranged between the detection portion and the cover member. In such a case, the detection portion is not pressed by the mold when resin is charged and pressurized in the mold. This prevents the detection portion from being damaged during formation of the resin molding portion and reduces the occurrence of defective products.

DETAILED DESCRIPTION OF THE PREFERRED EMBODIMENTS

A vehicle wheel speed sensor for detecting the rotation speed of a vehicle wheel according to a preferred embodiment of the present invention will now be described with reference to FIGS. 1 to 6.

Figure 1:
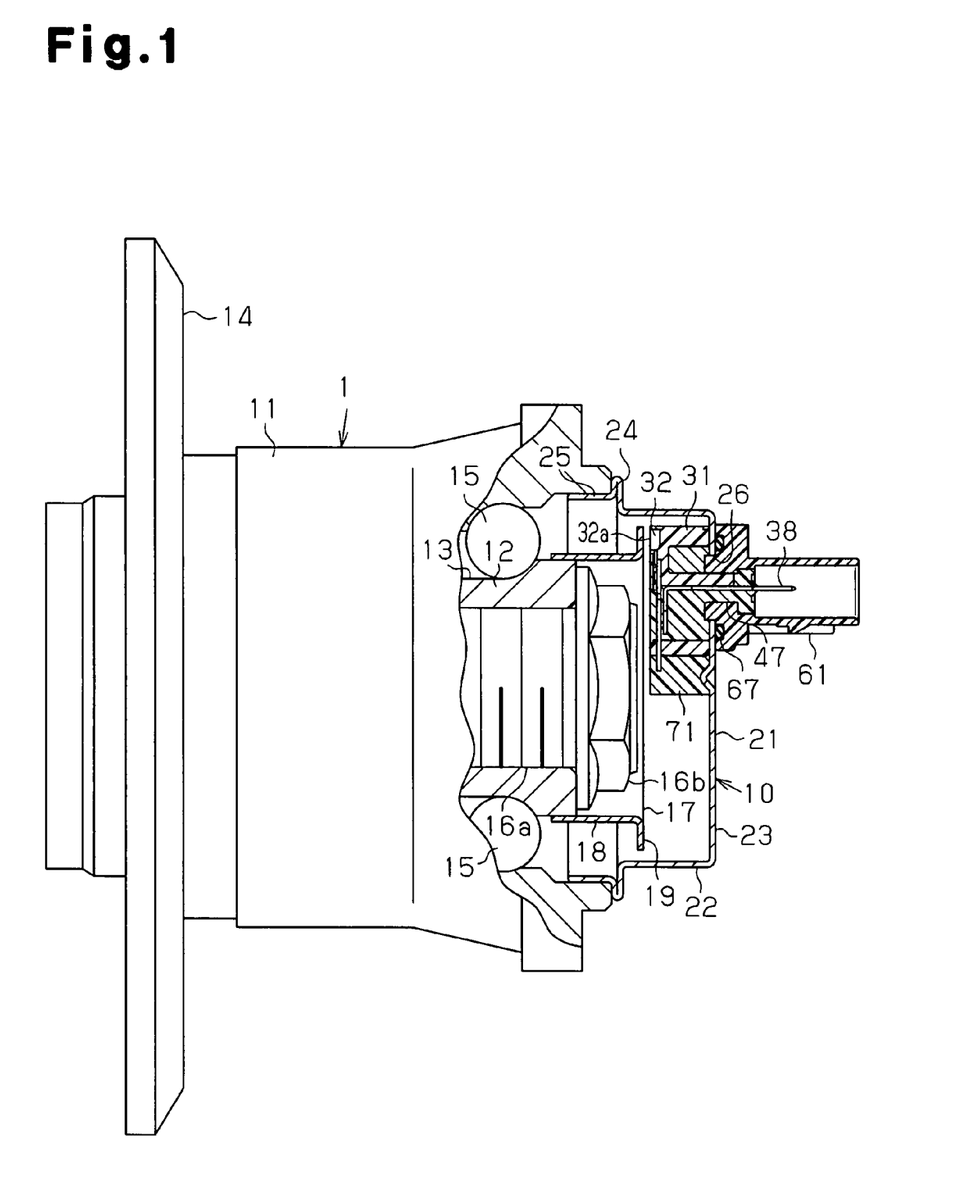
FIG. 1 is a side view showing a hub unit on which a vehicle wheel speed sensor of a preferred embodiment is mounted.

As shown in FIG. 1, a hub unit 1 includes an external cylinder 11, which functions as a non-rotating body, and an internal cylinder 12. The external cylinder 11 is fixed to a body (not shown) of a vehicle. The internal cylinder 12 is arranged inside the external cylinder 11. The internal cylinder 12 includes a cylindrical member 13 and a vehicle wheel fixing member 14 having a flange. The cylindrical member 13 and the vehicle wheel fixing member 14 are fixed to each other with a bolt 16a and a nut 16b. To describe the vehicle wheel speed sensor of the present invention, one side of the sensor to which a vehicle wheel is fixed (left side in FIG. 1) is referred to as a "vehicle wheel side," and the other side of the sensor opposite to the vehicle wheel side (right side in FIG. 1) is referred to as a "body side."

A plurality of balls 15 are arranged between an outer circumferential surface of the cylindrical member 13 and an inner circumferential surface of the external cylinder 11. The internal cylinder 12 is supported rotatably within the external cylinder 11 via the balls 15. A rotor 17 is fitted and fixed to an end portion of the cylindrical member 13 at the body side. The rotor 17 has a cylindrical portion 18 and a flange 19. The flange 19 extends outward from an end portion of the cylindrical portion 18 at the body side. The flange 19, which is formed from a magnetic material, is magnetized in a manner that its north pole and its south pole are positioned alternately along the circumferential direction of the rotor 17.

Figure 2:
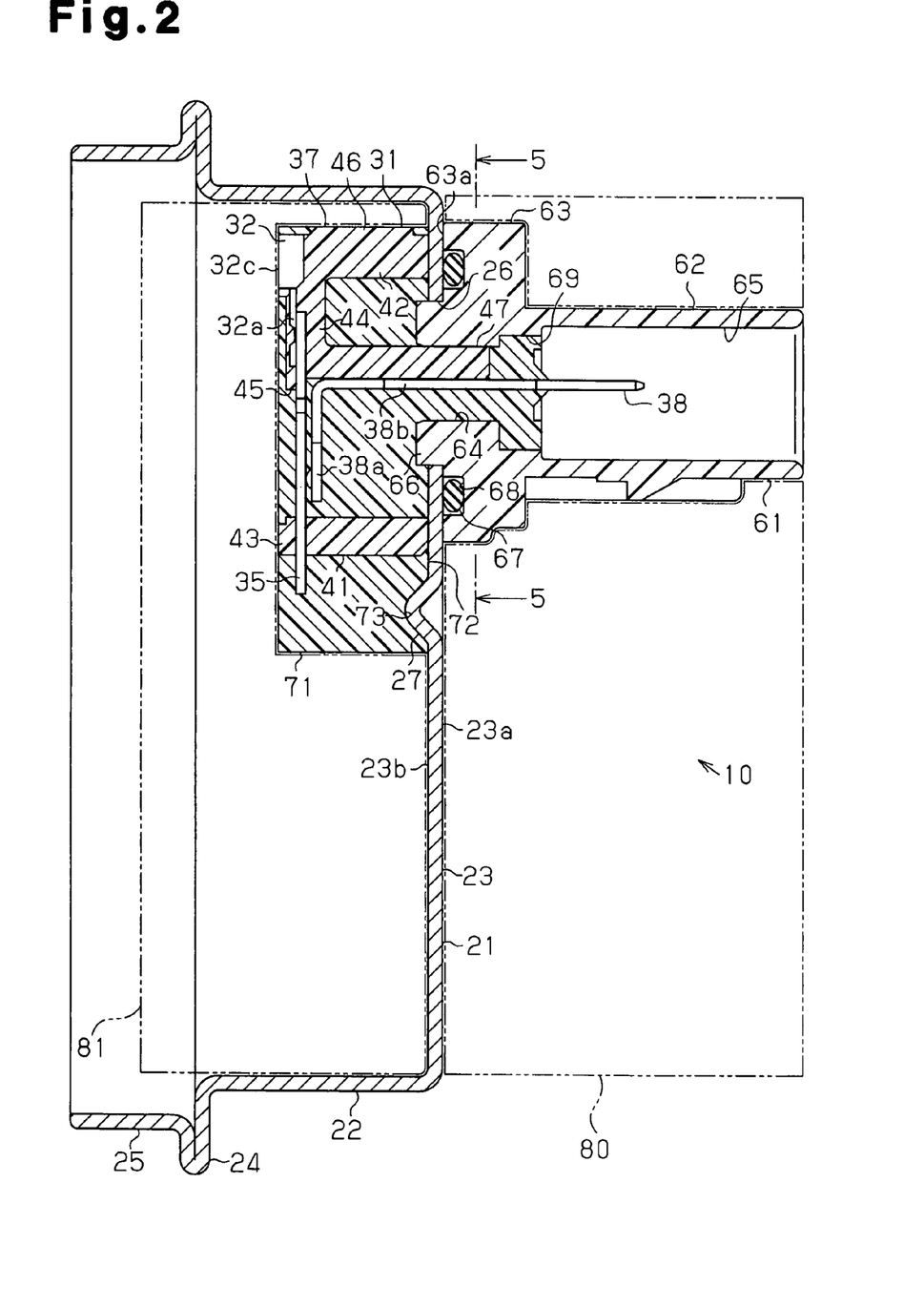
FIG. 2 is a cross-sectional view of the vehicle wheel speed sensor.

A vehicle wheel speed sensor 10 includes a cover member 21, a detection unit 31, a pair of connector terminals 38 and 39, a connector 61, and a resin molding portion 71. FIGS. 1 and 2 show only the connector terminal 38.

The cover member 21 is cylindrical and has a closed bottom. The cover member 21 includes a circumferential wall portion 22 and a mounting portion 23 that closes an end portion of the circumferential wall portion 22. The circumferential wall portion 22 has a substantially cylindrical shape. The mounting portion 23 has a circular disc shape. A positioning flange 24 is arranged on an end portion of the circumferential wall portion 22 at the vehicle wheel side. The positioning flange 24 is formed by outwardly bending part of the circumferential wall portion 22. The cover member 21 further includes a fixing cylindrical portion 25, which extends from the positioning flange 24 toward the vehicle wheel side. The thickness of the fixing cylindrical portion 25 is equal to the thickness of the circumferential wall portion 22. The outer diameter of the fixing cylindrical portion 25 is greater than the outer diameter of the circumferential wall portion 22 and is substantially equal to the inner diameter of an end portion of the external cylinder 11 at the body side. The vehicle wheel speed sensor 10 is fixed to the external cylinder 11 by press-fitting the fixing cylindrical portion 25 into the external cylinder 11. When the vehicle wheel speed sensor 10 is fixed to the external cylinder 11, the positioning flange 24 is abut against an end surface of the external cylinder 11 at the body side to position the cover member 21 with respect to the external cylinder 11. Further, the cover member 21 closes the body side end portion of the external cylinder 11. This structure prevents foreign matter from entering the external cylinder 11.

As viewed in FIG. 2, a mounting hole 26 is formed in the mounting portion 23 of the cover member 21 at a position upward from the middle of the mounting portion 23. Further, a movement restriction projection 27, which functions as a first engagement portion, is formed at a substantially middle position of the mounting portion 23. The movement restriction projection 27 projects toward the vehicle wheel side. The detection unit 31 includes a Hall device 32, which functions as a detection portion, a pair of connecting members 35 and 36, and a holding member 37 functioning as a holding portion for holding the Hall device 32 and the connecting members 35 and 36. FIG. 2 shows only the connecting member 35.

Figure 3A:
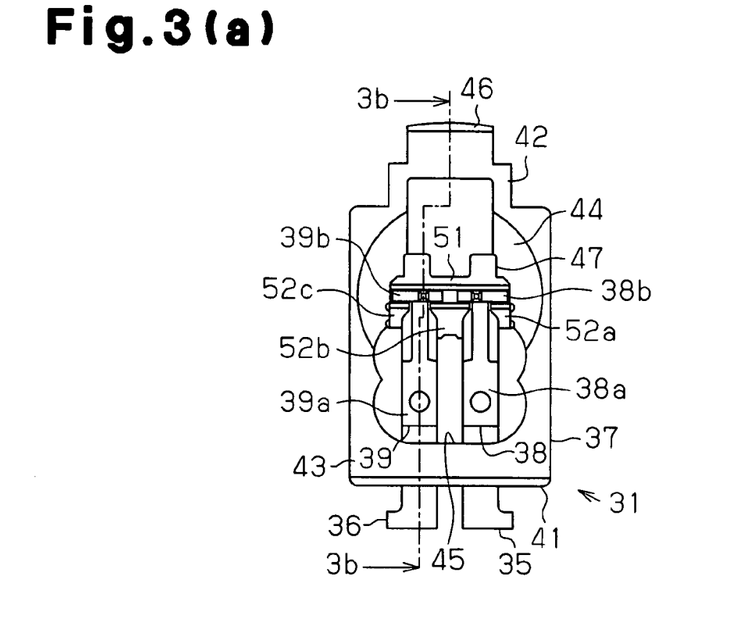
FIG. 3(a) is a plan view of a detection unit as viewed from the body side.
Figure 3B:
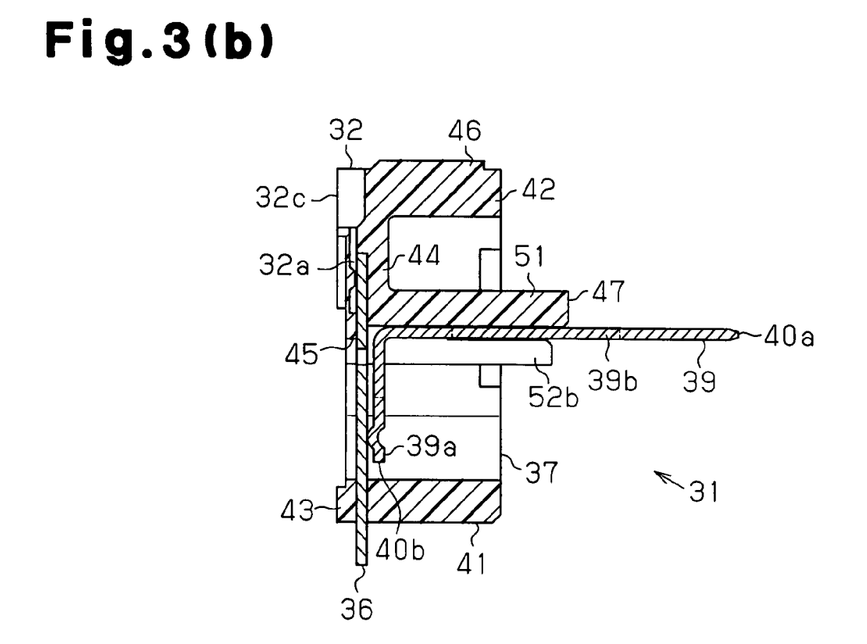
FIG. 3(b) is a cross-sectional view taken along line 3b-3b in FIG. 3(a)

As shown in FIGS. 3(a) and 3(b), the Hall device 32 has a pair of terminals 32a. The terminals 32a are electrically connected to the connecting member 35 and 36, respectively. The connecting members 35 and 36 are formed from a substantially rectangular plate, and are arranged in parallel spaced by a predetermined interval. FIG. 3(b) shows only the terminal 32a of the Hall device 32.

The holding member 37 includes a substantially box-shaped main body 41. A Hall device holding portion 42 is formed on an upper end of the main body 41. The main body 41 includes a hollow portion 43 having a square frame shape and a closed portion 44 for closing an upper half of an end portion of the hollow portion 43. Thus, an area of the end portion of the hollow portion 43 that is not closed by the closed portion 44 is formed as an exposing hole 45.

The connecting members 35 and 36 have their upper portions held by the closed portion 44. Further, the connecting members 35 and 36 are held by the hollow portion 43 with their lower portions projecting downward from the main body 41. With the two end portions of the connecting members 35 and 36 being held by the main body 41, substantially middle areas of the connecting members 35 and 36 are exposed through the exposing hole 45.

The Hall device 32 is held by the Hall device holding portion 42 in a state in which its detection surface 32c is exposed. In this state, each terminal 32a of the Hall device 32 is held by the closed portion 44 of the main body 41. Further, a projection 46 projecting closer to the circumferential wall portion 22 of the cover member 21 than the Hall device 32 is formed on an upper end of the Hall device holding portion 42 (refer to FIG. 2).

A terminal support portion 47 for supporting the connector terminals 38 and 39 is formed on the main body 41. The terminal support portion 47 extends toward the body side from the lower end of the closed portion 44 of the main body 41. The connector terminals 38 and 39 are each substantially L-shape and formed by press-molding a metal plate punched out into a predetermined shape. Each of the connector terminals 38 and 39 is bent at a substantially right angle to define by two regions, that is, first and second regions 40a and 40b that are. The first region 40a has a length that is slightly greater than twice the length of the hollow portion 43. The second region 40b has a length that is substantially half the length of the first region 40a.

Connecting portions 38a and 39a having a width substantially equal to the width of the connecting members 35 and 36 are defined on the first regions 40a of the corresponding connector terminals 38 and 39. The connecting portions 38a and 39a come in contact with portions of the connecting members 35 and 36 exposed through the exposing hole 45. This electrically connects the connector terminals 38 and 39 to the Hall device 32 via the connecting portions 38a and 39a and the connecting members 35 and 36. Supported portions 38b and 39b having a width greater than the width of the connecting portions 38a and 39a are arranged at the middle of the second regions 40b of the connector terminals 38 and 39.

The terminal support portion 47 has a length that is about half the length of the first region 40a of each of the connector terminals 38 and 39. The terminal support portion 47 includes a contact portion 51, against which an upper surface of each of the supported portions 38b and 39b abuts, and clamping portions 52a, 52b, and 52c for supporting the supported portions 38b and 39b from below. The connector terminals 38 and 39 are fixed to the holding member 37 by holding the supported portions 38b and 39b between the contact portion 51 and the clamping portions 52a, 52b, and 52c.

Figure 4:
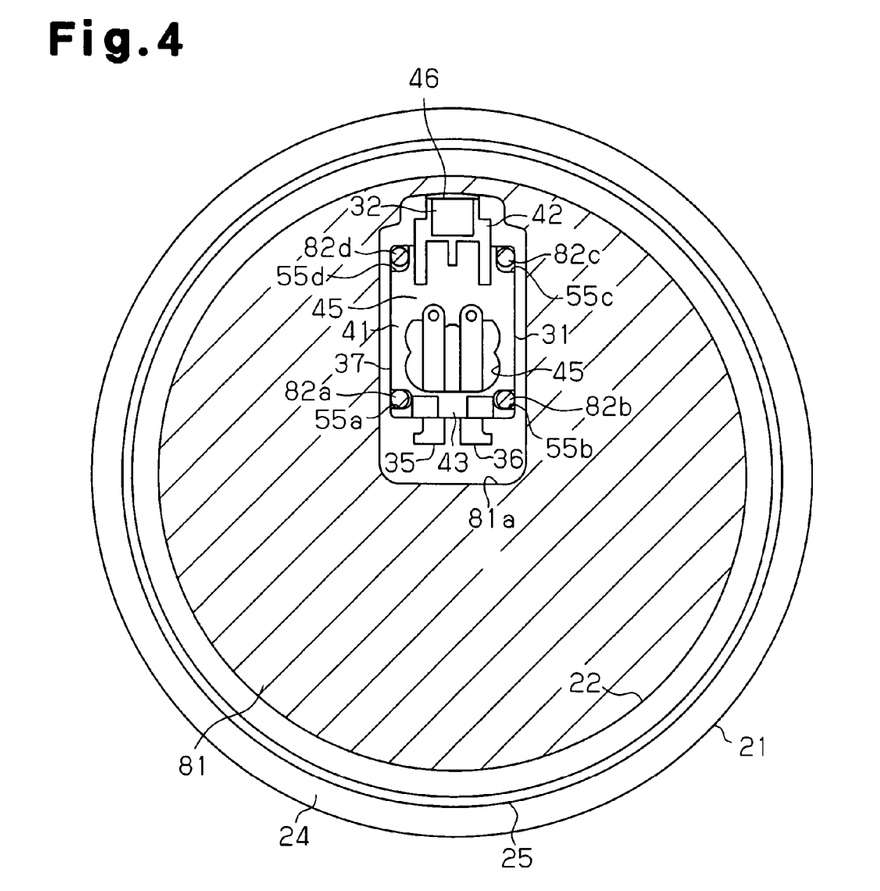
FIG. 4 is a cross-sectional view of the detection unit set on a cover member and fitted in a mold.

As shown in FIG. 4, four positioning recesses, that is, first to fourth positioning recesses 55a to 55d, are formed on an end surface of the main body 41 at the vehicle wheel side. The first and second positioning recesses 55a and 55b each have a U-shaped inner wall and are formed at near the two lower end corners of the main body 41. Further, the third and fourth positioning recesses 55c and 55d are formed by cutting out the two upper end corners of the main body 41. In a state in which the connector terminals 38 and 39 and the terminal support portion 47 are inserted in the mounting hole 26, the detection unit 31 is fixed to an inner surface 23b of the cover member 21 in a manner that the detection surface 32c of the Hall device 32 faces the flange 19 of the rotor 17 (refer to FIG. 1).

Figure 6A:
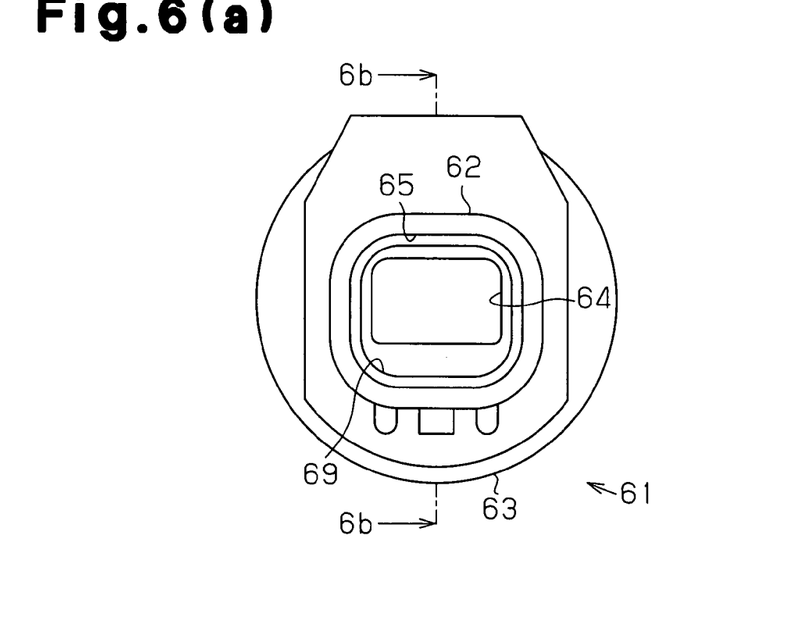
FIG. 6(a) is a plan view showing a connector.
Figure 6B:
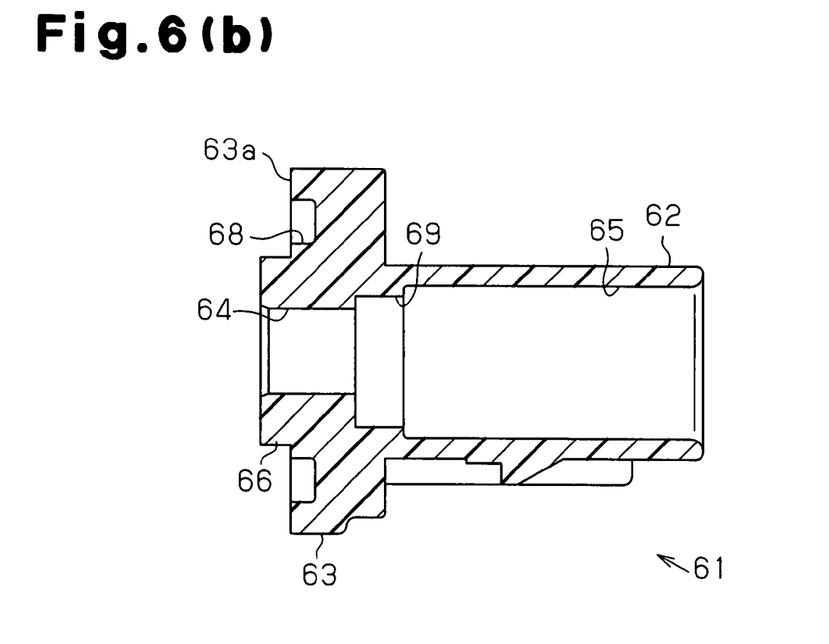
FIG. 6(b) is a cross-sectional view taken along line 6b-6b of FIG. 6(a).

As shown in FIGS. 6(a) and 6(b), the connector 61 includes a hollow connector main body 62 and a substantially annular fixing portion 63. The fixing portion 63 is formed on an end portion of the connector main body 62 at the vehicle wheel side. The connector main body 62 is connected to a mating connector (not shown) arranged on the vehicle on which the hub unit 1 shown in FIG. 1 is mounted. First and second insertion holes 65 and 64 in which the connector terminals 38 and 39 are inserted are respectively formed in the connector main body 62 and the fixing portion 63. The connector 61 includes a large diameter portion 69 having a diameter greater than the second insertion hole 64. The large diameter portion 69 communicates the first insertion hole 65 and the second insertion hole 64.

A mounting projection 66 is formed on an end surface 63a of the fixing portion 63. The mounting projection 66 projects from the end surface 63a. The mounting projection 66 is shaped so that the mounting projection 66 can be fitted into the mounting hole 26 of the cover member 21. Further, an annular accommodating groove 68 is formed in the end surface 63a of the fixing portion 63. The accommodating groove 68 surrounds the mounting projection 66. A rubber O-ring 67 is arranged in the accommodating groove 68 (refer to FIG. 2). The O-ring 67 prevents water from entering the connector 61 and the detection unit 31 through a gap formed between the cover member 21 and the connector 61.

Figure 5:
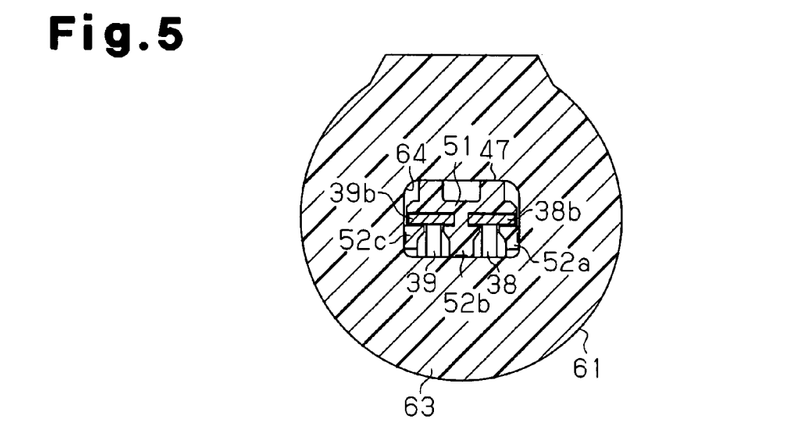
FIG. 5 is a cross-sectional view taken along line 5-5 in FIG. 2.

As shown in FIG. 5, the second insertion hole 64 is formed at the substantially center part of the outer shape of the connector 61. The second insertion hole 64 is formed at a position determined to be corresponding to the mating connector to which the connector 61 is connected. The resin molding portion 71 shown in FIGS. 1 and 2 is formed to fill the second insertion hole 64.

As shown in FIG. 2, the connector 61 is attached to an outer surface 23a of the cover member 21 by fitting the mounting projection 66 in the mounting hole 26 in a state in which the O-ring 67 is arranged in the accommodating groove 68. In a state in which the connector 61 is attached to the cover member 21, the connector terminals 38 and 39 and the terminal support portion 47 are inserted in the second insertion hole 64, and the distal portions of the connector terminals 38 and 39 are arranged in the second insertion hole 65.

The resin molding portion 71 is formed by solidifying resin charged into and around the holding member 37 and into the second insertion hole 64 and large diameter portion 69 of the connector 61. The resin molding portion 71 integrates the connector 61 and the detection unit 31 through the mounting hole 26 and integrates the cover member 21, the detection unit 31, the O-ring 67, and the connector 61. Further, the resin molding portion 71 formed in the large diameter portion 69 prevents the connector 61 from being separated from the cover member 21 (detection unit 31).

The resin molding portion 71 has a movement restriction recess 73, which functions as a second engagement portion, formed in a surface 72 facing the inner surface 23b of the mounting portion 23. The movement restriction projection 27 formed on the mounting portion 23 can be fitted into the movement restriction recess 73. Engagement of the movement restriction projection 27 with the movement restriction recess 73 restricts movement of the resin molding portion 71 relative to the cover member 21, that is, movement of the detection unit 31 relative to the cover member 21.

As shown in FIG. 1, the Hall device 32 detects a change in the magnetic flux caused by rotation of the rotor 17 in the vehicle wheel speed sensor 10. The Hall device 32 then provides a detection signal via the connector terminals 38 and 39 to an electronic control unit (ECU) that centralizes control over the vehicle. The ECU detects the rotation speed of the rotor 17 based on the detection signal from the vehicle wheel speed sensor 10 to detect the rotation speed of the vehicle wheel that rotates together with the rotor 17.

A method for mounting the vehicle wheel speed sensor 10 will now be described with reference to FIGS. 1 to 4.

First, the connector terminals 38 and 39 are press-fitted between the contact portion 51 of the terminal support portion 47 and the clamping portions 52a to 52c to attach the connector terminals 38 and 39 to the detection unit 31, which includes the Hall device 32 and the connecting members 35 and 36 (refer to FIGS. 3(a) and 3(b)). As a result, the supported portions 38b and 39b of the connector terminals 38 and 39 are supported as being held between the contact portion 51 and the clamping portions 52a to 52c and supported by the terminal support portion 47. After the attachment of the connector terminals 38 and 39, the connecting portions 38a and 39a of the connector terminals 38 and 39 and the connecting members 35 and 36 are spot welded and fixed together. As a result, the connector terminals 38 and 39 are electrically connected to the Hall device 32 by the connecting members 35 and 36.

Next, the connector 61 is arranged at the body side of the mounting portion 23, and the mounting projection 66 is fitted into the mounting hole 26 to attach the connector 61 to the cover member 21 (refer to FIG. 2). A notch (not shown) formed in the mounting hole 26 is engaged with a projection (not shown) formed on the mounting projection 66, and the vehicle wheel side end surface 63a of the fixing portion 63 is abut against the outer surface 23a of the mounting portion 23 to position the connector 61 with respect to the cover member 21.

Next, the detection unit 31 is arranged at the vehicle wheel side of the mounting portion 23 and the connector terminals 38 and 39 and the terminal support portion 47 are inserted in the second insertion hole 64 to attach the detection unit 31 to the cover member 21. The distal ends of the connector terminals 38 and 39 are arranged in the first insertion hole 65 of the connector 61.

Next, a first mold 80 is fitted to the connector 61, which is attached to the cover member 21, from the body side. A second mold 81 functioning as a mold is fitted to the detection unit 31, which is attached to the cover member 21, from the vehicle wheel side (refer to FIG. 4). As shown in FIG. 4, the second mold 81 is substantially cylindrical and has an outer diameter that is substantially equal to the inner diameter of the circumferential wall portion 22 of the cover member 21. A molding hole 81a for forming the resin molding portion 71 is formed in the second mold 81 at a position upward from the center of the second mold 81. When the second mold 81 is fitted to the cover member 21, the detection surface 32c of the Hall device 32 abuts against the bottom surface of the molding hole 81a.

Further, the projection 46 of the Hall device holding portion 42 abuts against the inner surface of the molding hole 81a of the second mold 81. This forms a gap between the inner surface of the molding hole 81a of the second mold 81 and the Hall device 32. First to fourth positioning projections 82a to 82d corresponding to the first to fourth positioning recesses 55a to 55d of the main body 41 are formed on the bottom surface of the molding hole 81a. Engagement of the first to fourth positioning recesses 55a to 55d with the first to fourth positioning projections 82a to 82d restricts movement of the detection unit 31 relative to the first and second molds 80 and 81.

Next, molten resin is charged into space defined in the first and second molds 80 and 81, that is, gaps formed between the outer circumferential surface of the holding member 37 and the inner surface of the molding hole 81a of the second mold 81, the inner side of the holding member 37, and in the second insertion hole 64 and the large diameter portion 69. The resin is solidified to form the resin molding portion 71 (refer to FIGS. 1 and 2). The resin molding portion 71 integrates the connector 61 and the detection unit 31 through the mounting hole 26 and integrates the cover member 21, the detection unit 31, the O-ring 67, and the connector 61. This completes the vehicle wheel speed sensor 10.

The present embodiment has the advantages described below.

(1) The vehicle wheel speed sensor 10 is formed by integrating the cover member 21, the connector 61, the detection unit 31, and the resin molding portion 71. Further, the detection unit 31 includes the Hall device 32, which is a semiconductor component. This eliminates the need for redesigning the detection unit 31 when selecting one of plural types of connectors in correspondence with a mating connector. Further, even when the outer diameter of the cover member 21 is changed, the detection unit 31 does not need to be redesigned in correspondence with the changed outer diameter of the cover member 21. Further, even when the position or the diameter of the rotor 17 is changed, it is only required that the position of the mounting hole 26 formed in the cover member 21 be changed. The detection unit 31 does not need to be redesigned in correspondence with the changed position or the changed diameter of the rotor 17. This enables a single type of the detection unit 31 to be adaptable to changes in the specifications of the connector 61, the cover member 21, the rotor 17, and the like. Accordingly, the burden of process management is alleviated.

(2) The connecting members 35 and 36 electrically connect the connector terminals 38 and 39 and the Hall device 32. This eliminates the need for redesigning the detection unit 31 even when selecting and attaching one of plural types of connector terminals in correspondence with a mating connector. Thus, this structure further facilitates adaptation to changes in the specifications for the connector 61, the cover member 21, the rotor 17, and the like.

(3) The connector 61 has the large diameter portion 69, the diameter of which is greater than the diameter of the second insertion hole 64. In this case, the resin molding portion 71 is formed in the large diameter portion 69. This prevents the connector 61 from being separated from the cover member 21 (detection unit 31).

(4) The engagement of the movement restriction projection 27 and the movement restriction recess 73 restricts movement of the resin molding portion 71 and the detection unit 31 relative to the cover member 21. The Hall device 32 of the detection unit 31 is arranged in a stable state at a position where it faces the rotor 17 without being affected by vibrations and the like. This enables rotation of the rotor 17 to be detected with high accuracy.

(5) The engagement of the first to fourth positioning recesses 55a to 55d and the first to fourth positioning projections 82a to 82d enables the detection unit 31 to be positioned relative to the second mold 81. This prevents the detection unit 31 from being displaced relative to the first and second molds 80 and 81 during formation of the resin molding portion 71. As a result, the Hall device 32 is held at a predetermined position. This enables the rotation speed of the rotor 17 to be detected with high accuracy.

(6) The connector terminals 38 and 39 are supported by the terminal support portion 47 of the holding member 37. This enables the connecting portions 38a and 39a to be positioned relative to the connecting members 35 and 36 when the connector terminals 38 and 39 are connected to the connecting members 35 and 36. This further prevents the connector terminals 38 and 39 from being displaced or deformed during formation of the resin molding portion 71 and thereby reduces defective products.

(7) When the second mold 81 is fitted to the cover member 21 during formation of the resin molding portion 71, the projection 46 of the Hall device holding portion 42 is abut against the inner surface of the molding hole 81a of the second mold 81. The projection 46 distances the inner surface of the molding hole 81a of the second mold 81 from the Hall device 32. Thus, during formation of the resin molding portion 71, the inner surface of the molding hole 81a of the second mold 81 is not pressed against the Hall device 32 when resin is charged and pressurized in the first and second molds 80 and 81. This prevents the Hall device 32 from being damaged during molding and reduces the defective products.

The above embodiment may be modified in the following forms.

In the above embodiment, the mounting portion 23 of the cover member 21 may include the movement restriction recess 73, and the resin molding portion 71 may include the movement restriction projection 27. This also restricts movement of the detection unit 31 and the resin molding portion 71 relative to the cover member 21. Further, a plurality of movement restriction projections 27 and a plurality of movement restriction recesses 73 may be formed.

In the above embodiment, the first to fourth positioning projections 82a to 82d of the second mold 81 and the first to fourth positioning recesses 55a to 55d of the main body 41 may be replaced by three positioning projections and three positioning recesses. Further, the first to fourth positioning recesses 55a to 55d may be formed as circular holes.

Although the large diameter portion 69 is formed on the body side end portion of the second insertion hole 64 in the above embodiment, the large diameter portion 69 may be formed at any position excluding the vehicle wheel side end portion of the second insertion hole 64. Further, the second insertion hole 64 may be formed to have a plurality of large diameter portions 69. In such cases, the resin molding portion 71 formed in the large diameter portion 69 prevents the connector 61 from being separated from the cover member 21 (detection unit 31).

In the above embodiment, the connector terminals 38 and 39 may be changed to, for example, wire harnesses.

In the above embodiment, the connecting members 35 and 36 of the detection unit 31 may be eliminated. In this case, it is only required that the connector terminals 38 and 39 are directly connected to the Hall device 32.

In the above embodiment, the O-ring 67 may be eliminated when sealing is not required in the vehicle wheel speed sensor 10.

In the above embodiment, the rotation detection sensor of the present invention may be used to detect the rotation speed of a rotating body other than a vehicle wheel.

In the above embodiment, the bolt 16a and the nut 16b may be eliminated, and the end portion of the vehicle wheel fixing member 14 may be press-fitted and fixed to the cylindrical member 13 instead.

The invention claimed is:

1. A method of producing a rotation detection sensor for attachment to a non-rotating body for detecting rotation of a magnetized rotor based on a change in magnetic flux, the method comprising steps of:

preparing a cover member attached to the non-rotating body and having a mounting hole;

arranging a detection unit on a surface of the cover member at a side of the rotor, the detection unit including a holding portion for holding a detection portion outputting a detection signal in accordance with a change in magnetic flux caused by rotation of the rotor, the detection portion being electrically connected with a pair of connector terminals;

arranging a connector main body including an insertion hole therein on a surface of the cover member at a side opposite the rotor such that the pair of connector terminals are inserted into the insertion hole;

arranging a first mold to be fitted to the connector main body;

arranging a second mold to be fitted to the detection unit such that the detection portion abuts against a bottom surface of a molding hole of the second mold and a space is defined between the first mold and the molding hole of the second mold, the space including a gap formed between an outer circumferential surface of the holding portion and an inner side of the molding hole of the second mold, an inner side of the holding portion, and the insertion hole of the connector main body; and charging resin into the space to form a resin molding portion in the space and to integrate the detection unit, the connector main body, the pair of connector terminals, and the cover member.

2. The method according to claim 1, wherein:
the detection unit includes a connecting member arranged between the connector terminal and the detection portion to electrically connect the connector terminal and the detection portion.

3. The method according to claim 1, wherein:
the connector main body includes a large diameter portion having a diameter greater than a diameter of an opening of the insertion hole near the detection unit.

4. The method according to claim 1, wherein:
the cover member includes a first engagement portion, and the resin molding portion includes a second engagement portion engageable with the first engagement portion, and engagement of the first engagement portion with the second engagement portion restricts movement of the detection unit relative to the cover member.

5. The rotation method according to claim 1, wherein:
the holding portion includes a positioning recess engageable with a positioning projection formed in a mold for forming the resin molding portion.

6. The method according to claim 5, wherein:
the holding portion includes a support portion for supporting the connector terminal.

7. The method according to claim 5, wherein:
the holding portion has a projection located to be closer to an outer rim of the cover member than the detection portion.

* * * * *

UNITED STATES PATENT AND TRADEMARK OFFICE
CERTIFICATE OF CORRECTION

PATENT NO. : 7,683,609 B2  Page 1 of 1
APPLICATION NO. : 11/795012
DATED : March 23, 2010
INVENTOR(S) : Kimura et al.

It is certified that error appears in the above-identified patent and that said Letters Patent is hereby corrected as shown below:

On the Title Page of the patent, Under Item (86) PCT No., please delete

"PCT/JP2006/000353"

and add:

"PCT/JP2006/300353"

Signed and Sealed this

Eighteenth Day of May, 2010

David J. Kappos
*Director of the United States Patent and Trademark Office*